July 15, 1930.                C. S. SELTZER                  1,770,435
           MACHINE FOR VACUUMIZING AND GASSING FOOD CONTAINERS
                        Filed Feb. 13, 1925        6 Sheets-Sheet 1

July 15, 1930.   C. S. SELTZER   1,770,435
MACHINE FOR VACUUMIZING AND GASSING FOOD CONTAINERS
Filed Feb. 13, 1925   6 Sheets-Sheet 5
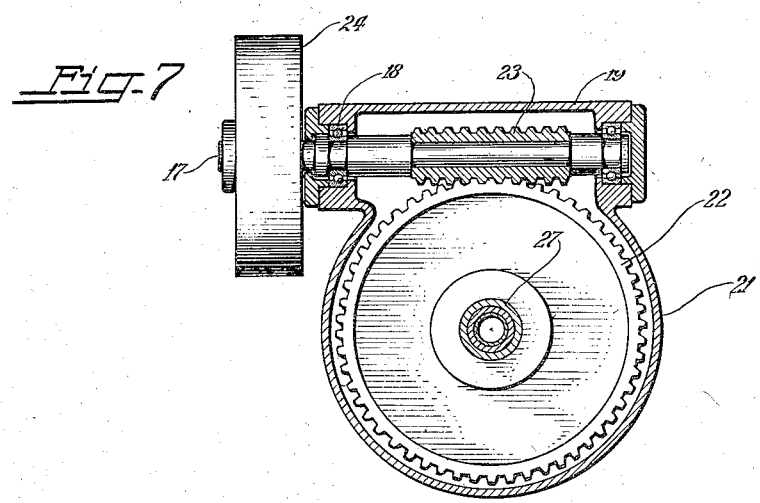
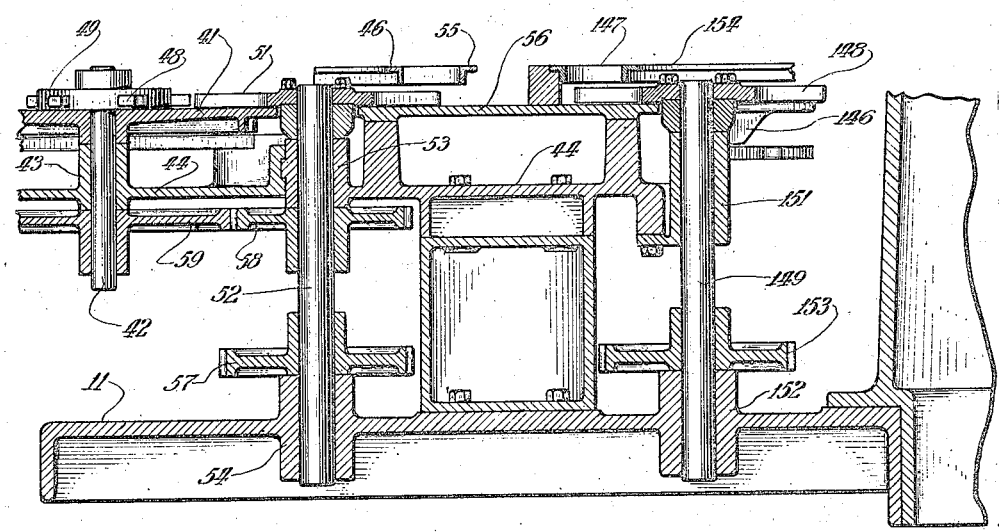
INVENTOR.
Clifford S. Seltzer
BY: Munday, Clarke &
Carpenter
ATTORNEY July 15, 1930.  C. S. SELTZER  1,770,435
MACHINE FOR VACUUMIZING AND GASSING FOOD CONTAINERS
Filed Feb. 13, 1925  6 Sheets-Sheet 6
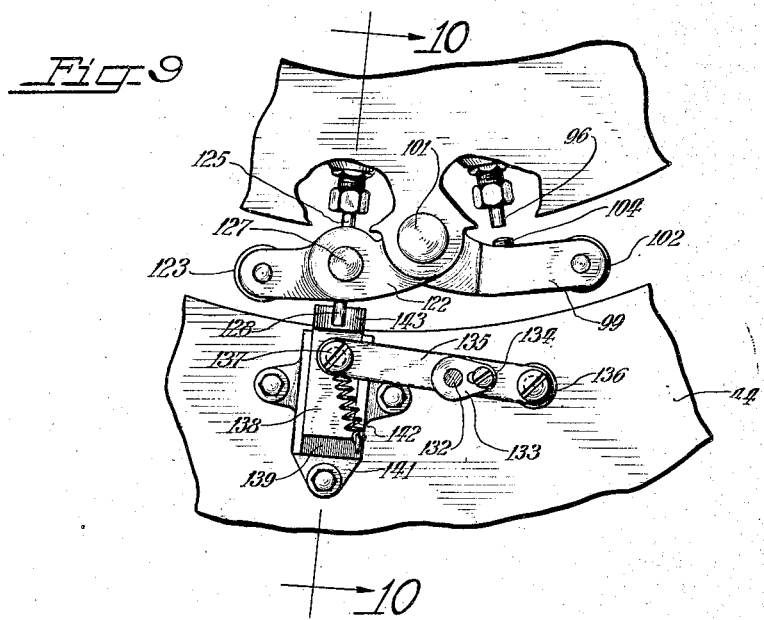
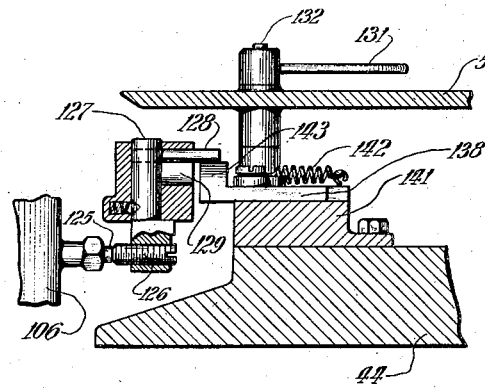
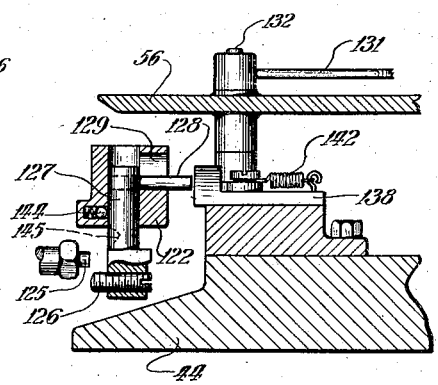
INVENTOR
Clifford S. Seltzer
BY Munday, Clarke
Carpenter
ATTORNEY

Patented July 15, 1930

1,770,435

UNITED STATES PATENT OFFICE

CLIFFORD S. SELTZER, OF NEWARK, NEW JERSEY, ASSIGNOR TO AMERICAN CAN COMPANY, OF NEW YORK, N. Y., A CORPORATION OF NEW JERSEY

MACHINE FOR VACUUMIZING AND GASSING FOOD CONTAINERS

Application filed February 13, 1925. Serial No. 8,947.

My invention relates to apparatus for replacing air in filled food containers with a preservative gas, such as carbon dioxid, in accordance with a practice which has now become quite well known in the canning industry.

The apparatus used for this purpose in the past has ordinarily been of the hand operated type, involving either separate chambers for the vacuumizing and gassing operations, or a single chamber provided by a bell-shaped enclosing member adapted to be raised and lowered by hand and having associated therewith suitable air and gas valves adapted to successively withdraw the air from a container positioned in the chamber and thereafter to admit the gas to replace the air withdrawn.

Such apparatus, particularly the latter type mentioned, has been found quite satisfactory under certain conditions, but is subject to two serious disadvantages, namely the slow rate of production possible with a hand operated machine and the non-uniform percentages of gas in different cans, due to varied and inaccurate control by the operator. It is the object of my invention, therefore, to provide, for this purpose, a machine which is automatic in action and adapted both for high speed, quantity production and uniformly accurate results, independent of the element of human skill necessarily affecting the results obtained with any hand operated apparatus.

Another object of the invention is the provision, in a machine of the character stated, of means for automatically preventing the admission of gas when no can has been positioned to receive it, thus avoiding wastage and saving considerably in the expense of operation.

The various mechanisms included in the machine are so related and synchronized that the cans are automatically positioned in properly spaced and timed relationship and are thereafter enclosed in a chamber which is first placed in communication with a vacuum tank or pump to withdraw the desired amount of air from the can and is then opened to a source of gas under pressure, which fills the vacuumized space in said can, the can being automatically discharged after the foregoing operations are completed. Furthermore, it is contemplated that a suitable number of enclosing members may be provided, in accordance with the size and capacity of machine desired, to meet varying requirements in any particular plant.

Numerous other objects and advantages of the invention will be apparent as it is better understood from the following description, which, taken in connection with the accompanying drawings, discloses a preferred embodiment thereof.

Referring to the drawings,

Fig. 7 is a horizontal section of the driving gear housing, some of the parts being shown in plan;

Fig. 8 is a vertical sectional view, taken substantially on the section line 8—8 of Fig. 2 and illustrating the can entrance and discharge mechanisms;

Fig. 9 is a fragmentary plan and sectional view, partially broken away and illustrating the details of the no-can-no-gas mechanism;

Fig. 10 is a sectional view, taken substantially on the line 10—10 in Fig. 9 and showing the mechanism in operative position; and Fig. 11 is a similar view, showing the mechanism in inoperative position.

Figure 1:
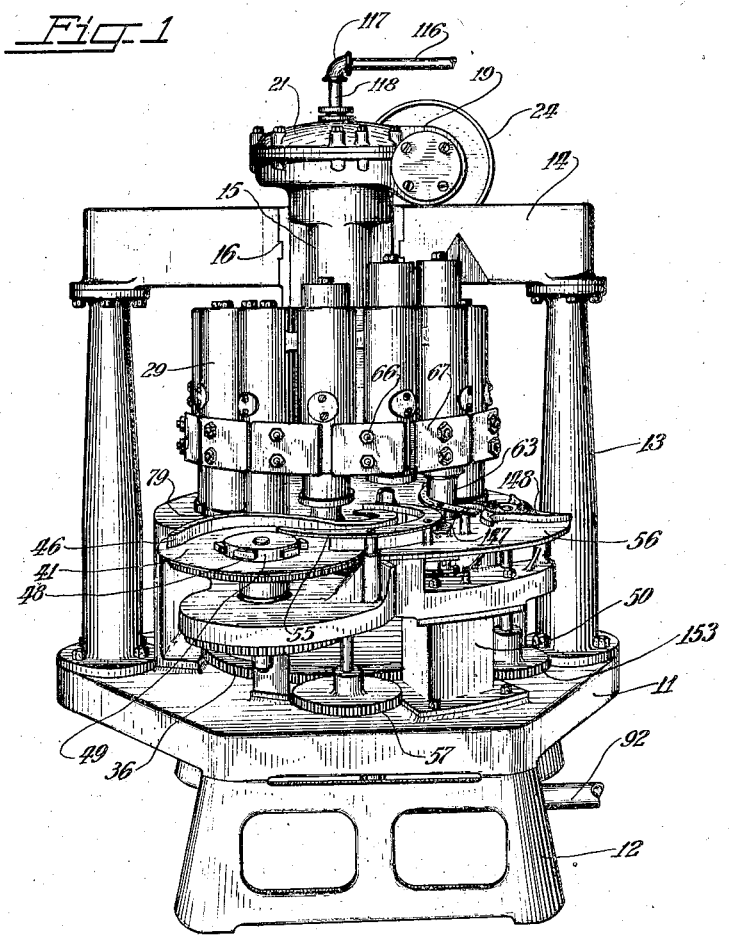
Figure 1 is a perspective view of a machine in which my invention is embodied.

In said drawings, illustrating the best manner in which I have thus far contemplated applying the principles of my invention, the reference character 11 indicates a main supporting table, mounted upon side frames or legs 12 and having secured to the upper surface thereof two tubular uprights 13, secured at the top to cross connections 14 which engage a central tubular frame part 15 in tongue and slot connections 16.

Figure 3:
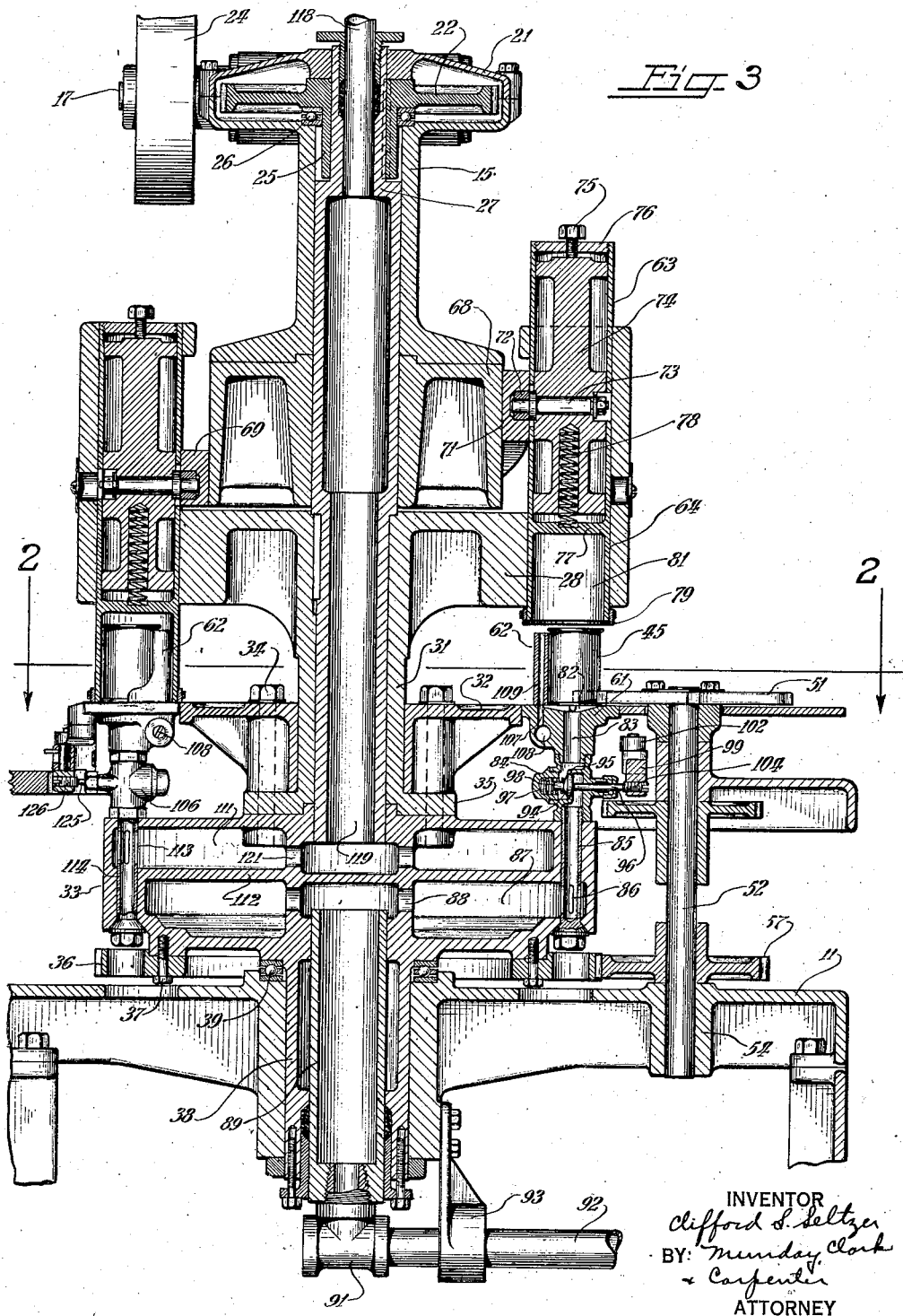
Fig. 3 is an enlarged vertical sectional view of the machine on line 3—3 of Figure 2, certain parts being shown in elevation.

The main driving mechanism, illustrated in detail in Figs. 3 and 7, comprises a shaft 17, having bearings 18 in a side extension 19 of a gear housing 21, which latter encloses a worm wheel 22, meshing with a worm 23 upon said shaft 17, which latter is driven from any suitable source of power by means of a belt pulley 24.

The worm wheel 22 is formed with a depending collar 25 disposed within a bearing 26 in the gear housing 21 and secured to a vertical tubular shaft 27 extending through the center of the machine. Said shaft 27 carries a rotatable unit, consisting primarily of a turret 28 upon which are mounted a plurality of can enclosing units, generally indicated by the reference character 29 in Fig. 1. Beneath and secured to a downward extension 31 of the turret 28 is a can supporting disk 32 and a hollow drum 33, which is secured to the central rotatable unit by means of screws 34, extending through the disk 32, a lateral flange 35 of the turret extension 31 and the top of said drum, all as clearly shown in Fig. 3. A ring gear 36 is secured to the bottom of the drum 33 by means of screws 37 and said drum has a depending tubular extension 38 disposed within bearings 39 provided at the top of the table 11.

Figure 2:
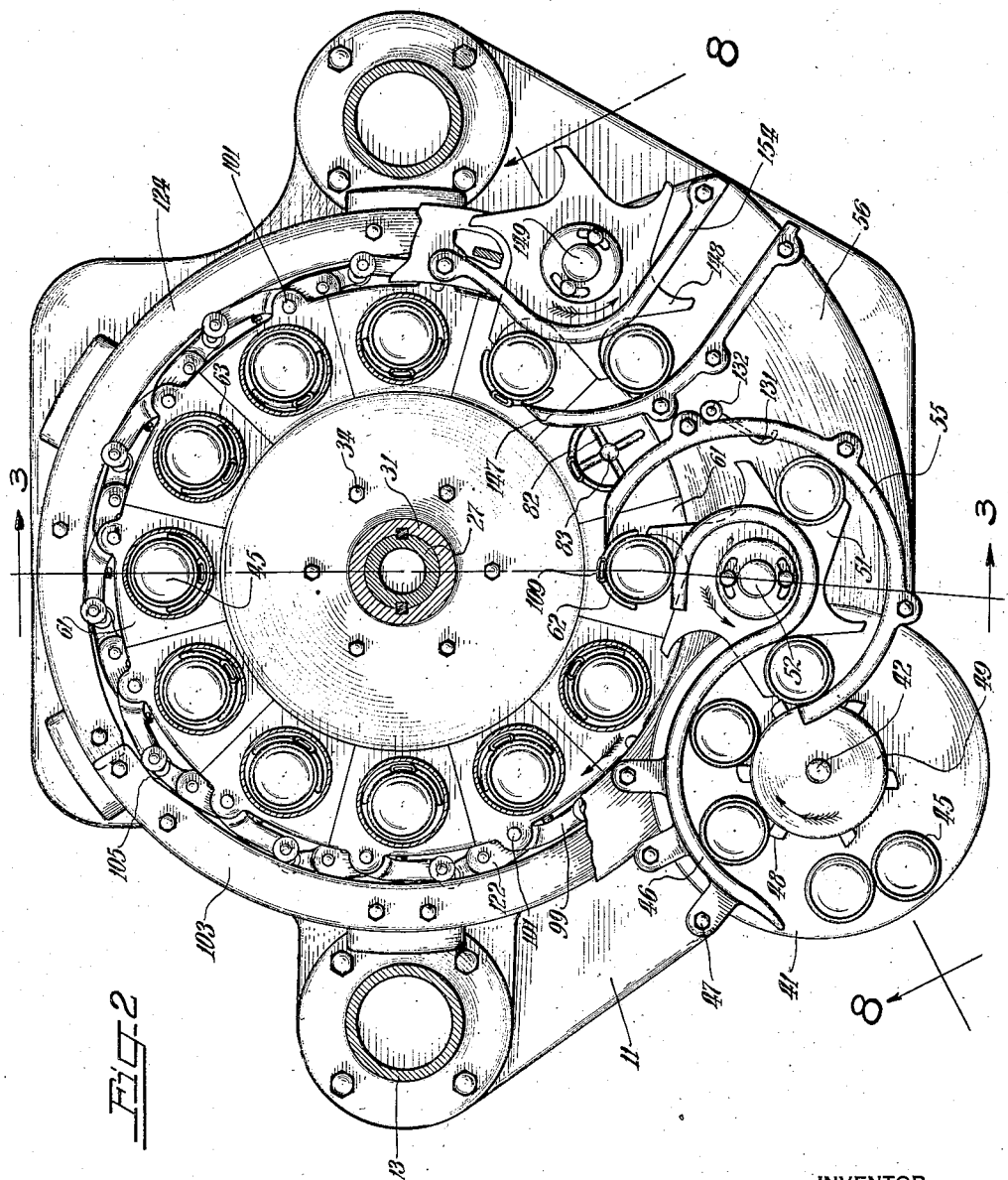
Fig. 2 is a sectional plan view, taken substantially on the plane indicated by the line 2—2 of Fig. 3.

The mechanism just described will be later referred to more in detail in connection with the discussion of associated parts, attention being now directed particularly to Figs. 1, 2 and 8, illustrating the can feeding and timing mechanism. An entrance disk 41 is mounted upon a short shaft 42, which has a bearing 43 in a supporting table 44 and is adapted to have cans 45 placed thereon by hand, or by any suitable feeding mechanism, the cans at this time being filled and having their covers loosely applied. I have found that the ordinary can cover may be used successfully, inasmuch as the vacuumizing operation lifts it from the container sufficiently to withdraw the air from the contents of said container and it may be sufficiently loose to permit the gas to enter. However, if greater speed is desired, a can cover made in accordance with the disclosure in the pending application of Charles Pickles, Serial No. 667,320, may be used.

A fixed guide rail 46 is secured to the table 11 at 47 adjacent the disk 41 and a part thereof is disposed over said disk and adapted to cooperate with spring pressed fingers 48 on a small disk 49 positioned at the center of said disk 41 to direct the cans in a circular path of travel, spacing and timing them in proper order for delivery to a feed-in star wheel 51, which is mounted upon a shaft 52, which is journaled in bearings 53 and 54 formed respectively in the tables 44 and 11. A cooperating guide rail 55 is provided upon a horizontal plate 56, one end thereof extending over the disk 41 and said guide rails together providing a semi-circular path through which the cans are directed by the star wheel 51 to the rotating mechanism of the machine. The shaft 52 carries a gear 57, meshing with the ring gear 36 and mating gears 58 and 59 mounted respectively upon said shaft 52 and the shaft 42 serve to impart rotation to the entrance disk 41. The feed-in and timing mechanism just described is clearly shown in Patent No. 1,166,492 to Swan Tevander.

The cans are delivered by the star wheel 51 onto supports 61 carried by the disk 32, these supports being segments of a ring upon the periphery of said disk 32 (see Figs. 2 and 3). There are, in the present instance, 12 of said can supports, though it will be apparent that a desired number might be provided according to the size of machine desired. Each support is provided with a can stop wall or can centering member 62, against which the cans are positioned by said star wheel 51 and by which they are held until discharged from the machine.

Figure 6:
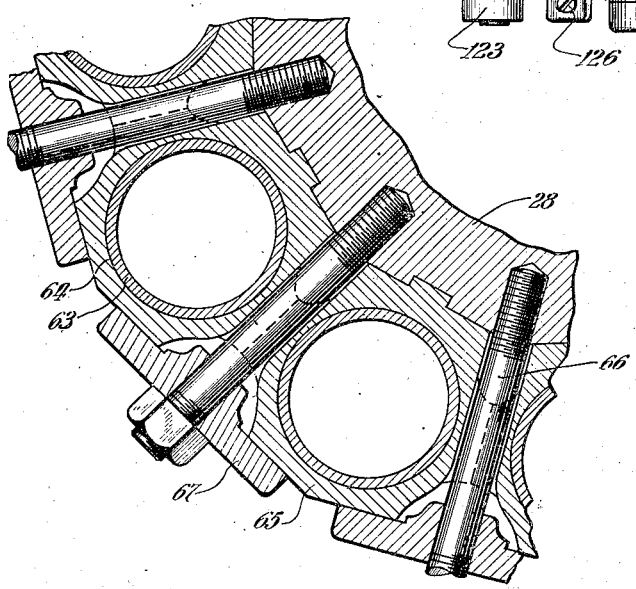
Fig. 6 is a partial horizontal section of the turret of the machine, showing the means for mounting the slidable can enclosing members.

Referring now particularly to Figs. 3 and 6, it will be seen that a plurality of sleeves 63 are provided in bores 64 in cylinders 65 secured to the turret 28 by means of screws 66 (Fig. 6), extending through clamping plates 67 and into the outer face of said turret, the number of said sleeves corresponding to the number of can supports 61 and the sleeves being arranged in axial alignment with said supports. Said sleeves are reciprocated to cause them to close down over the cans after they have been positioned upon the supports 61 and to be raised to permit discharge of the cans by means of a central stationary cam 68 surrounding the shaft 27 and disposed beneath the tubular extension 15 of the gear housing 21. Said cam is provided with an outer track part 69, having a groove 71 in the face thereof. Each sleeve is provided with a cam following roller 72, carried upon a stud 73 extending through a core part 74, slidably mounted within said sleeve 63 between a set screw 75 in a head 76 and a web 77 in the lower part of said sleeve, a spring 78 being interposed between said web and the core part, as shown clearly in Fig. 3. A resilient sealing ring 79 is provided at the bottom of each sleeve and the cam track is arranged to cause the sleeves to be lowered just beyond the point of entrance of the can, thereby enclosing each can in a chamber 81 in the lower part of the sleeve and sealing said chamber against the outside atmosphere. Inasmuch as the cam acts upon the sleeves through the core parts 74 and springs 78, the rings 79 are held against the supports 61 under the tension of said springs 78, and since they are formed of rubber, or other suitable resilient material, such rings provide an air-tight joint so that a vacuum may be created within the chamber 81 and the gas admitted to the vacuumized chamber, in manner which will next be described.

Radial slots 82 are formed upon the top of each of the can supports 61 and extend from points beyond the outer wall of the can, when the latter is positioned, to a central bore 83, which leads to a valve 84 interposed between said support and a vertical pipe 85 which extends through the drum 33 and is provided at its lower end with slots 86, communicating with a vacuum chamber 87 in the lower part of said drum. Said vacuum chamber is in communication through ports 88 with a vertical pipe 89 extending through the depending tubular extension 38 of said drum 33 and communicating through a T 91 with a pipe 92 supported in a bracket 93 depending from the table 11, said pipe 92 communicating with exhausting means such as a suitable vacuum tank or pump illustration of which is not necessary to an understanding of my invention.

Figure 4:
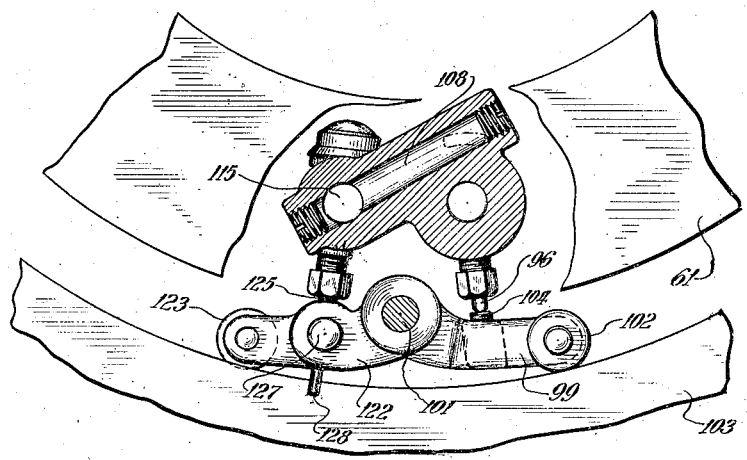
Fig. 4 is a view, partially in plan and partially in section, of the vacuum and gas valves and the means for operating the same.
Figure 5:
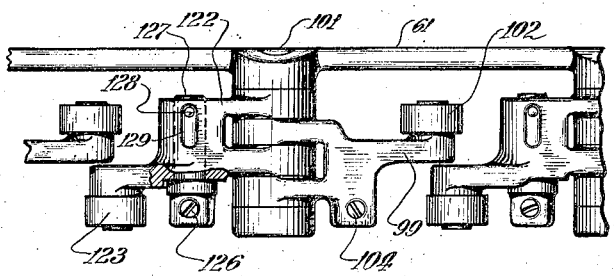
Fig. 5 is an elevational view of the valve operating means shown in Fig. 4.

The valve 84 is shown in detail in Fig. 3 of the drawings and comprises a valve member 94, normally in contact with a valve seat 95 and having a valve stem 96 projecting from the valve toward the exterior of the machine, a spring 97 housed within the valve and fitted over a projection 98 on the valve member 94 serving to hold said valve normally against its seat. Said valve is adapted to be automatically operated by control mechanism shown in detail in Figs. 3, 4 and 5. Said mechanism comprises an arm 99, pivoted upon a stud 101 depending from the can support 61 (see Fig. 2), said arm carrying at its outer end a cam following roller 102, following a circular cam track 103, a screw 104 being provided in said arm and adapted to contact with the valve stem 96 when the arm is forced inwardly by the cam 103, thereby opening the valve 84 and establishing communication of the chamber 81 with the vacuum chamber 87. The air is thus withdrawn from the chamber 81 and from the interior of the can positioned in said chamber until the valve is allowed to close by the cam 103, which extends only part way around the machine and has a depression 105 at the end thereof, which permits the roller 102 to move outwardly and allows the valve to close under the tension of the spring 97.

The next operation is the admission of the gas to fill the vacuumized space within the can, and this is accomplished by means of a gas valve, shown at the left in Fig. 3 and controlled by mechanism shown in Figs. 4, 5 and 9 to 11, inclusive. Said valve, which I have indicated by the reference character 106, communicates with the chamber 81 by means of a vertical channel 107 (Fig. 3), leading from a horizontal bore 108 in the valve to a passage 109 in the can centering wall 62, the gas being thereby delivered at a position within the chamber 81 adjacent the top of the can 45. Gas is supplied to said valve 106 from a gas chamber 111, formed in the drum 33 and separated from the vacuum chamber 87 by means of a partition 112, said gas passing through slots 113 in a vertical pipe 114 positioned in said drum 33 adjacent the pipe 85 and communicating with a vertical bore 115 (Fig. 4) in the valve 106. The gas is supplied to said chamber 111 through a supply pipe 116, connected by an elbow 117 and with a vertical pipe 118 extending into the top of the hollow shaft 27, which latter opens at the bottom into a small chamber 119, communicating through ports 121 with said chamber 111.

Said valve is actuated by means of an arm 122, pivoted on the stud 101 and carrying at its outer end a roller 123 adapted to follow a circular cam 124, shown clearly in Fig. 2. A stem 125, protruding from the valve 106, is adapted to be acted upon by a screw 126 positioned in the lower part of a pin 127 carried by the arm 122, the valve construction being such that when said stem is moved inwardly, the valve is opened to admit the gas to the chamber 81 and is automatically closed when said stem is out of contact with the screw 126.

Referring now to Figs. 9 to 11, inclusive, I will describe the mechanism which I have provided to prevent the operation of the gas valve when no can has been positioned upon the associated support, it being highly desirable, under such circumstances, to avoid the admission of gas to the vacuumized chamber and consequent wastage thereof when the sleeve forming said chamber is lifted. The pin 127 is normally arranged in the position shown in Fig. 11 and carries an outwardly projecting pin 128, disposed in a slot 129 in the arm 122. It will be apparent that in this position the screw 126 is out of registration with the valve stem 125 and that actuation of the arm 122 does not affect said valve. When, however, a can is fed into the machine, the no-can-no-gas mechanism is actuated to arrange the screw 126 in position to act upon the valve stem 125 of the valve associated with the support upon which the can is positioned. For this purpose, a lever 131 is arranged in the path of travel of the cans as they are directed into the machine by the star wheel 51 (see Fig. 2), this lever being mounted upon a vertical shaft 132, having bearings in the plate 56 and carrying at its lower end a slotted arm 133, secured by means of a screw 134 to an arm 135, pivoted at 136 to the supporting table 44 (see Fig. 9). Said arm 135 is connected at its opposite end by means of a screw 137 with a slide block 138, movable in a guideway 139 in a plate 141 secured to the top of said supporting table 44. Said block 138 is normally held in its retracted position by means of a spring 142, secured at one end to said plate 141 and at its opposite end to the block 138 at the point of attachment of the arm 135. Actuation of the lever 131 by the contact of a can with the free end thereof rocks the shaft 132, which, through the arm 133, moves the lever 135 upon its pivot, projecting the block 138 to the outer position shown in Fig. 10 of the drawing. The outer part of said block is formed with an inclined cam projection 143, adapted to act upon the pin 128 when the block is projected to lift the pin 127 to position in which the screw 126 is in alignment with the valve stem 125. A spring-pressed ball 144, arranged in the lower part of the arm 122, is adapted to engage within a recess 145 in said pin 127 to hold the same in elevated position after it has been lifted by the mechanism just described. It will be understood that only one lever 131 and one slide block 138 need be provided and that these parts are so related and synchronized to the can feeding mechanism that they act upon the valve control associated with the support upon which the can actuating said lever is positioned by the star wheel 51. The spring 142 serves to restore the parts of the no-can-no-gas mechanism to the original position, it being understood, however, that the can is in contact with the lever 131 a sufficient length of time to elevate the pin 127 to the position shown in Fig. 10 before said spring is permitted to act to restore the parts to starting position. For the purpose of restoring said pin 127 to the down position, I provide an inclined cam track 146 on the under side of the plate 56 adjacent the discharge station of the machine (see Fig. 8).

As a can approaches the discharge station, the sleeve 63 by which it is enclosed is raised by the cam 68 and the can is directed against a guide rail 147, after which it is engaged by a discharge star wheel 148, carried upon a shaft 149, having bearings 151 and 152 in the plate 56 and table 11 and being driven by means of a gear 153 meshing with the ring gear 36 secured to the bottom of the drum 33. The can is directed by said star wheel 148 between the guide rail 147 and a cooperating guide rail 154 and may be removed from the machine in any suitable manner.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A machine for vacuumizing and gassing filled containers, comprising a rotatable can support having a plurality of can stations thereon, mechanism for feeding the cans to said support and timing them for delivery successively to said stations, a can enclosing member associated with each can station and movable with said support and vertically reciprocable during rotation thereof to enclose and seal the can from the outside atmosphere for a predetermined length of time and then to uncover the same to permit removal, an air valve for opening the space enclosed by said member to exhaust to vacuumize the can, means automatically operable during rotation of said support for controlling said valve, a gas valve, means for automatically opening said valve after the can has been vacuumized to admit gas to the vacuumized space therein, and a device for preventing opening of said gas valve when no can is positioned in the associated station to receive the gas, said valve opening means comprising a pivoted member carrying a relatively movable part arrangeable to engage the valve stem and a cam for controlling said member, and said device comprising a pivoted lever arranged in the path of the incoming cans and a member movable by said lever when actuated by a can to arrange said relatively movable part of the valve opening means in position to engage said valve stem.

2. In a machine for exhausting and closing cans the combination of a can-enclosing chamber having a sleeve extending upward therefrom, a turret having a slide bearing for said chamber, a core part within and movable relative to said sleeve, a spring whereby the core part may actuate said chamber, and means for reciprocating said core part.

CLIFFORD S. SELTZER.